(12) United States Patent
Wang et al.

(10) Patent No.: US 12,489,476 B2
(45) Date of Patent: Dec. 2, 2025

(54) COMMUNICATIONS DEVICE AND METHOD FOR COMPENSATING FREQUENCY RESPONSE DISTORTION OF COMMUNICATIONS DEVICE

(71) Applicant: Realtek Semiconductor Corp., HsinChu (TW)

(72) Inventors: Wu-Chi Wang, HsinChu (TW); Tzu-Ming Kao, HsinChu (TW); Yuan-Shuo Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 408 days.

(21) Appl. No.: 18/096,539

(22) Filed: Jan. 12, 2023

(65) Prior Publication Data
US 2023/0238991 A1 Jul. 27, 2023

(30) Foreign Application Priority Data
Jan. 25, 2022 (TW) .................................. 111103203

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
CPC .............. H04B 1/04; H04B 2001/0408; H04B 2001/0416; H04B 2001/0425; H04B 2001/0433; H04B 2001/045; H04B 1/0475
See application file for complete search history.

(56) References Cited

U.S. PATENT DOCUMENTS

| 7,035,601 B2 * | 4/2006 | Karjalainen ......... H04B 1/0475 455/114.3 |
| 9,768,987 B2 * | 9/2017 | Ramesh ............ H04L 25/03343 |
| 10,224,970 B2 * | 3/2019 | Pratt .................... H04B 1/0475 |

FOREIGN PATENT DOCUMENTS

| KR | 100545461 B1 * | 1/2006 | ........... H03F 1/3247 |
| TW | I694697 B | 5/2020 | |

OTHER PUBLICATIONS

KR 100545461 B1, "Adaptive Pre-Equalization Apparatus For Correcting Linear Distortion of a Non-Ideal Data Transmission System.", Jan. 24, 2006. (English Text) (Year: 2006).*

(Continued)

*Primary Examiner* — Quochien B Vuong
(74) *Attorney, Agent, or Firm* — Winston Hsu

(57) ABSTRACT

A communications device and a method for compensating frequency response distortion of the communication device are provided. The communications device includes a transmitting path circuitry, a receiving path circuitry, a memory pre-distortion circuit, a pre-equalizer circuit and a pre-equalization calculation circuit. The transmitting path circuitry and the receiving path circuitry are configured to generate a feedback signal according to a pre-distortion test signal, where a set of pre-distortion coefficients of the memory pre-distortion circuit are calibrated according to the feedback signal. After calibration of the set of pre-distortion coefficients is finished, the pre-equalization calculating circuit performs calculation on the set of pre-distortion coefficients to generate a calculation result for calibrating the pre-equalizer circuit. After calibration of the pre-equalizer circuit is finished, a transmission signal is processed by the pre-equalizer circuit and the memory pre-distortion circuit first, and then output to outside of the communications device via the transmitting path circuitry.

6 Claims, 5 Drawing Sheets

(56) References Cited

OTHER PUBLICATIONS

KR 100545461 B1, "Adaptive Pre-Equalization Apparatus For Correcting Linear Distortion of a Non-Ideal Data Transmission System.", Twitchell et al., Jan. 24, 2006, (English Text). (Year: 2006).*

* cited by examiner

COMMUNICATIONS DEVICE AND METHOD FOR COMPENSATING FREQUENCY RESPONSE DISTORTION OF COMMUNICATIONS DEVICE

BACKGROUND OF THE INVENTION

1. Field of the Invention

The present invention is related to signal pre-processing of communications devices, and more particularly, to a communications device and a method for compensating frequency response distortion of the communications device.

2. Description of the Prior Art

In current wireless wideband communications devices, various signal processing methods are utilized to improve linearity. These signal processing methods have some disadvantages, however. For example, when these signal processing methods perform pre-processing on a signal within a wireless wideband communications device for the purpose of improving the linearity, a frequency response of this wireless wideband communications device may be distorted due to the pre-processing.

Thus, there is a need for a novel method and associated architecture to solve the problem of the related art without introducing any side effect or in a way that is less likely to introduce side effects.

SUMMARY OF THE INVENTION

An objective of the present invention is to provide a communications device and a method for compensating frequency response distortion of the communications device which can improve linearity of the communications device without introducing any frequency response distortion or in a way that is less likely to introduce frequency response distortion.

At least one embodiment of the present invention provides a communications device. The communications device comprises a transmitting path circuitry, a receiving path circuitry, a memory pre-distortion circuit, a pre-equalizer circuit and a pre-equalization calculation circuit, wherein the memory pre-distortion circuit and the pre-equalizer circuit are electrically coupled at a front-end of the transmitting path circuitry, and the pre-equalization calculation circuit is electrically coupled to the pre-equalizer circuit. The transmitting path circuitry is configured to generate an output test signal according to a pre-distortion test signal, and the receiving path circuitry is configured to generate a feedback signal according to the output test signal, wherein a set of pre-distortion coefficients of the memory pre-distortion circuit is calibrated according to the feedback signal. In addition, after calibration of the set of pre-distortion coefficients of the memory pre-distortion circuit is finished, the pre-equalization calculating circuit receives the set of pre-distortion coefficients for performing calculation on the set of pre-distortion coefficients to generate a calculation result, and the pre-equalizer circuit is calibrated according to the calculation result. More particularly, after calibration of the pre-equalizer circuit is finished, a transmission signal is processed by the pre-equalizer circuit and the memory pre-distortion circuit first, and then output to outside the communications device via the transmitting path circuitry.

At least one embodiment of the present invention provides a method for compensating frequency response distortion of a communications device. The method comprises: utilizing a transmitting path circuitry of the communications device to generate an output test signal according to a pre-distortion test signal; utilizing a receiving path circuitry of the communications device to generate a feedback signal according to the output test signal; calibrating a set of pre-distortion coefficients of a memory pre-distortion circuit of the communications device according to the feedback signal; after calibration of the set of pre-distortion coefficients of the memory pre-distortion circuit is finished, utilizing a pre-equalization calculating circuit of the communications device to receive the set of pre-distortion coefficients for performing calculation on the set of pre-distortion coefficients to generate a calculation result; and calibrating a pre-equalizer circuit of the communications device according to the calculation result. In addition, after calibration of the pre-equalizer circuit is finished, a transmission signal is processed by the pre-equalizer circuit and the memory pre-distortion circuit first, and then output to outside the communications device via the transmitting path circuitry.

According to the communications device and the method provided by the embodiments of the present invention, the pre-equalizer circuit can compensate frequency response distortion caused by performing pre-processing on a path circuitry comprising low pass filter(s). In addition, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
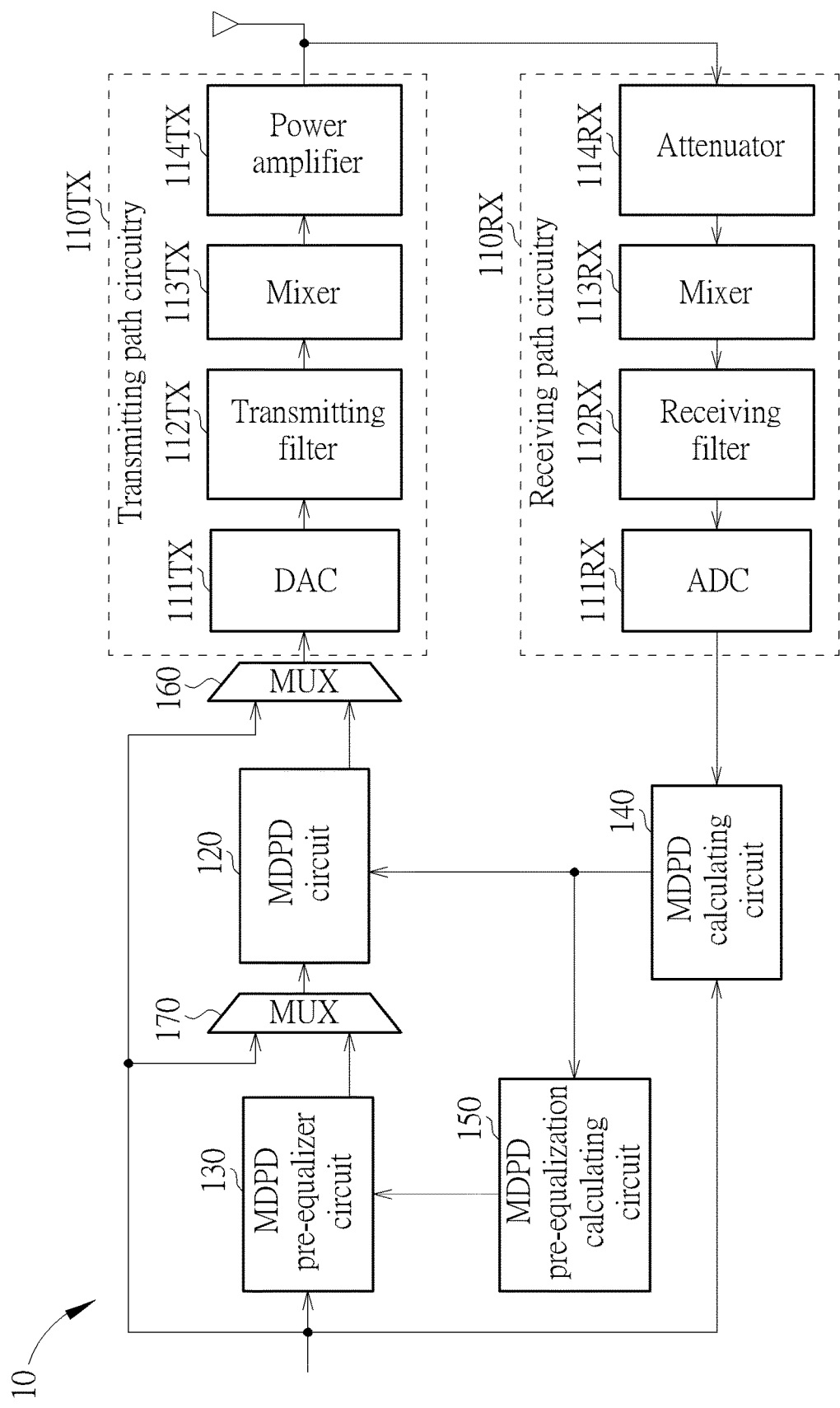
FIG. 1 is a diagram illustrating estimation of memory digital pre-distortion (MDPD) coefficients in a communications device according to an embodiment of the present invention.

FIG. 1 is a diagram illustrating estimation of memory digital pre-distortion (MDPD) coefficients in a communications device such as a transceiver 10 according to an embodiment of the present invention. As shown in FIG. 1, the transceiver 10 may comprise a transmitting path circuitry 110TX, a receiving path circuitry 110RX, an MDPD circuit 120 and an MDPD pre-equalizer circuit 130. In this embodiment, the transmitting path circuitry 110TX may comprise a digital-to-analog converter (DAC) 111TX, a transmitting filter 112TX, a mixer 113TX and a power amplifier 114TX, and the receiving path circuitry 110RX may comprise an analog-to-digital converter (ADC) 111RX, a receiving filter 112RX, a mixer 113RX and an attenuator 114RX. In this embodiment, the transceiver 10 may further comprise an MDPD calculating circuit 140 and an MDPD pre-equalization calculating circuit 150, where the transceiver 10 may utilize the MDPD calculating circuit 140 to calibrate the MDPD circuit 120 (e.g., calibrating a set of pre-distortion coefficients of the MDPD circuit 120) first, and then utilize the MDPD pre-equalization calculating circuit 150 to calibrate the MDPD pre-equalizer circuit 130 according to the set of pre-distortion coefficients. In particular, after calibration of the MDPD circuit 120 is finished, the MDPD circuit 120 may be configured to compensate non-linear distortion of the power amplifier 114TX within the transmitting path circuitry 110TX; and after calibration of the MDPD pre-equalizer circuit 130 is finished, the MDPD pre-equalizer circuit 130 may be configured to compensate frequency response distortion generated by the MDPD circuit 120 being calibrated under a condition of either of the transmitting path circuitry 110TX and the receiving path circuitry 110RX comprising a filter (e.g. the transmitting filter 112TX and/or the receiving filter 112RX). For example, when the transmitting path circuitry 110TX and/or the receiving path circuitry 110RX comprise any filter, the MDPD circuit 120 may generate frequency response distortion according to a frequency response of this filter after the MDPD circuit 120 is calibrated, and this frequency response distortion may be compensated or canceled by the MDPD pre-equalizer circuit 130. In addition, both the MDPD circuit 120 and the MDPD pre-equalizer circuit 130 are electrically coupled at a front-end of the transmitting path circuitry 110TX, and after calibration of both the MDPD circuit 120 and the MDPD pre-equalizer circuit 130 are finished, a transmission signal may be processed by the MDPD pre-equalizer circuit 130 and the MDPD circuit 120 first, and then output to outside the transceiver 10 via the transmitting path circuitry 110TX (e.g. via an antenna electrically coupled to the transmitting path circuitry 110TX). In this embodiment, the transceiver 10 may utilize multiplexers (MUXs) 160 and 170 therein to control calibration signal paths of the MDPD circuit 120 and the MDPD pre-equalizer circuit 130 (e.g. utilizing a controller therein to generate multiple control signals respectively for controlling the MUX 160 and the MUX 170 to enable one of an upper path circuitry and a lower path circuitry thereof); details related to the calibration of the MDPD circuit 120 and the MDPD pre-equalizer circuit 130 will be described in subsequent paragraphs. In some embodiments, the MUX 170 may be omitted, and an output terminal of the MDPD circuit 120 may be electrically coupled to an output terminal of the MDPD pre-equalizer circuit 130, but the present invention is not limited thereto.

Figure 2:
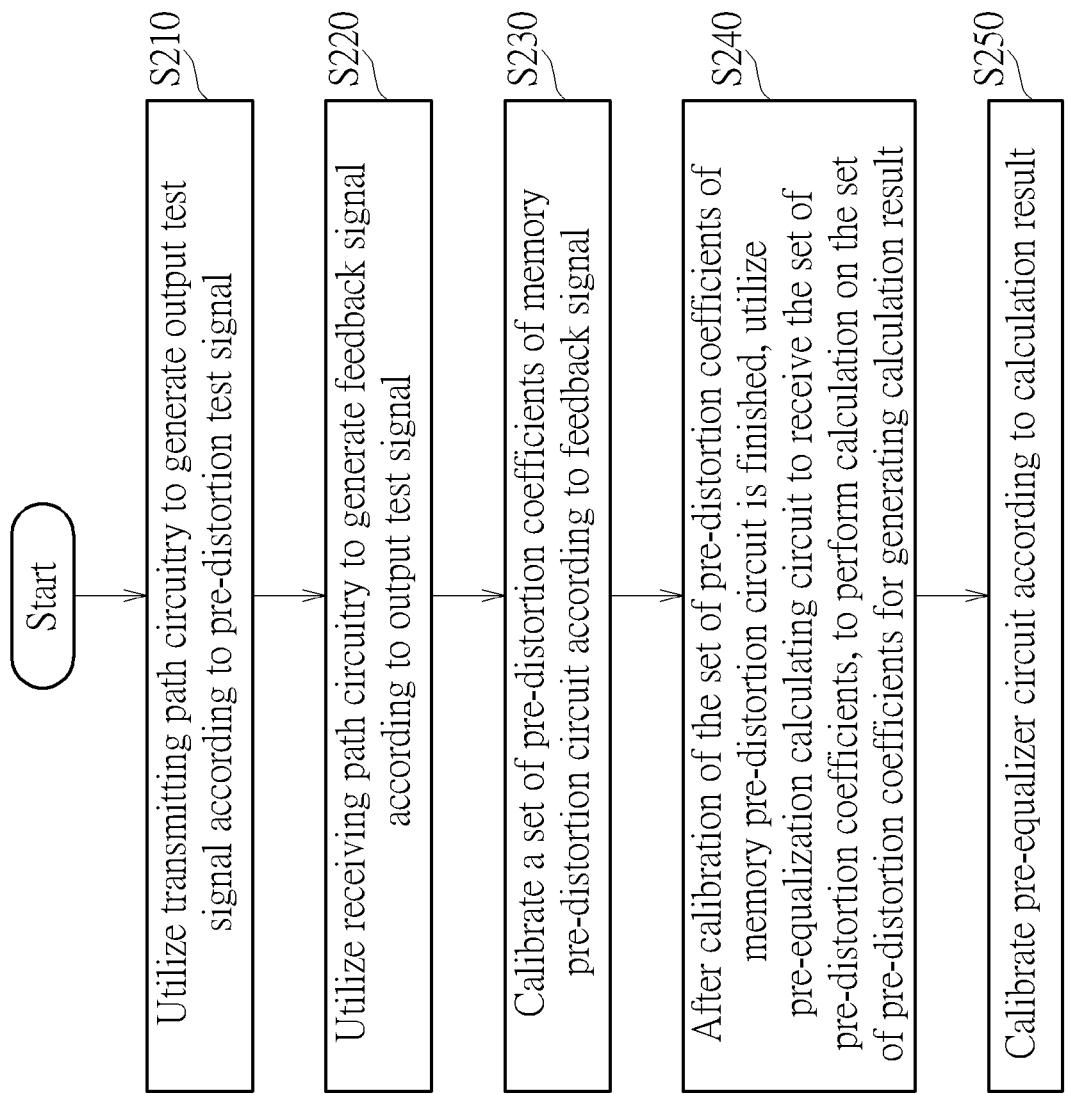
FIG. 2 is a diagram illustrating a working flow of a method for compensating frequency response distortion of the communications device shown in FIG. 1 according to an embodiment of the present invention.

FIG. 2 is a diagram illustrating a working flow of a method for compensating frequency response distortion of a communications device such as the transceiver 10 shown in FIG. 1 according to an embodiment of the present invention. It should be noted that the working flow shown in FIG. 2 is for illustrative purposes only, and is not meant to be a limitation of the present invention. More particularly, one or more steps may be added, deleted or modified in the working flow shown in FIG. 2. In addition, if an overall result is not hindered, these steps do not have to be executed in the exact order shown in FIG. 2.

In Step S210, the communications device utilizes a transmitting path circuitry therein to generate an output test signal according to a pre-distortion test signal.

In Step S220, the communications device utilizes a receiving path circuitry therein to generate a feedback signal according to the output test signal.

In Step S230, the communications device calibrates a set of pre-distortion coefficients of a memory pre-distortion circuit therein according to the feedback signal.

Figure 3:
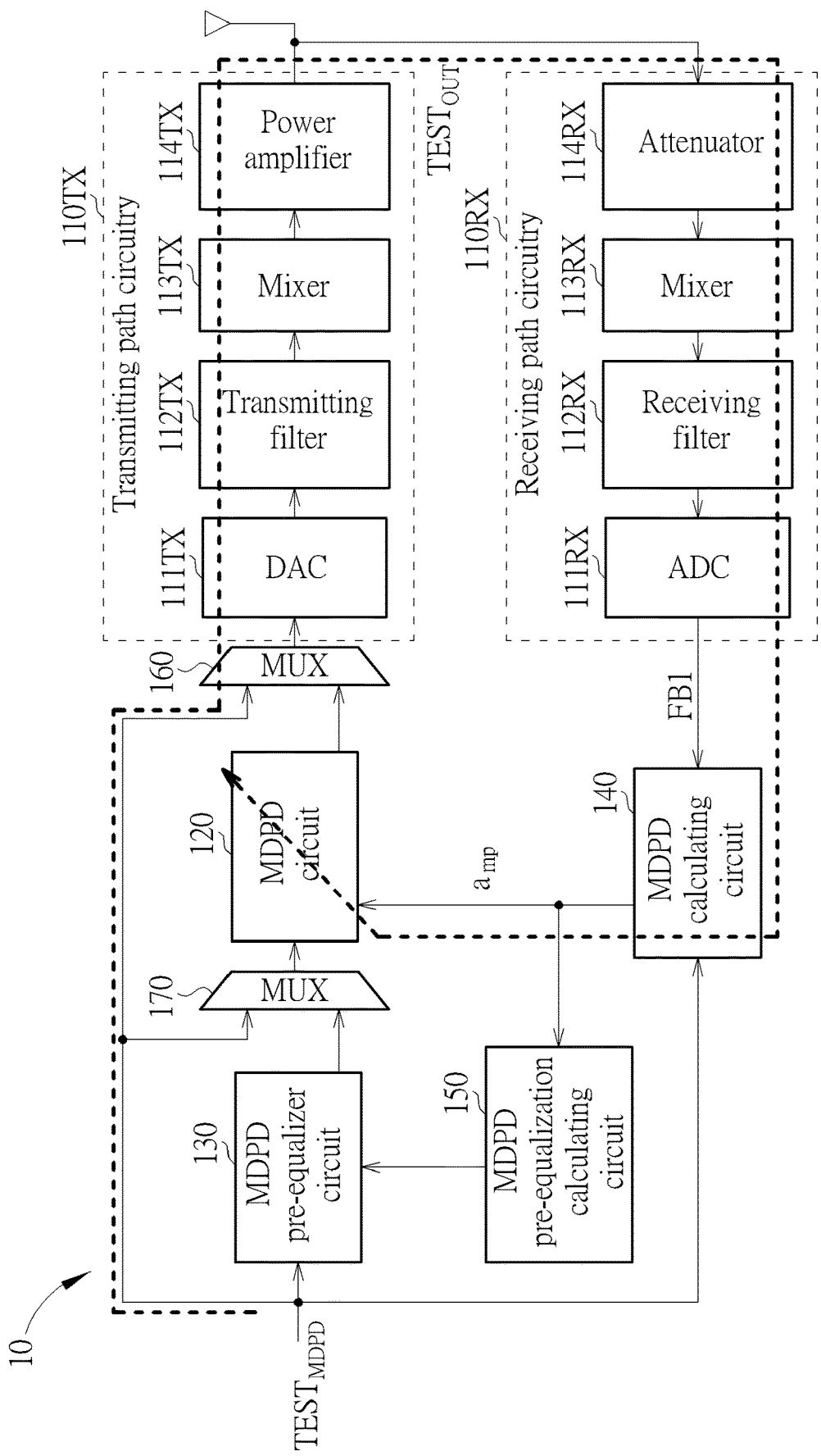
FIG. 3 is a diagram illustrating calibration of an MDPD circuit within the communications device shown in FIG. 1 according to an embodiment of the present invention.

For better comprehension of the operations from Steps S210 to S230, refer to FIG. 3. The transceiver 10 (e.g. the controller therein) may control the MUX 160 to enable the upper path circuitry thereof and disable the lower path circuitry thereof to bypass the MDPD pre-equalizer circuit 130 and the MDPD circuit 120, in order to input a pre-distortion test signal $TEST_{MDPD}$ to the transmitting path circuitry 110TX without pre-processing of the MDPD pre-equalizer circuit 130 and the MDPD circuit 120. The pre-distortion test signal $TEST_{MDPD}$ is thereby sequentially processed by the DAC 111TX, the transmitting filter 112TX, the mixer 113TX and the power amplifier 114TX for generating an output test signal $TEST_{OUT}$. The output test signal $TEST_{OUT}$ may be transmitted to the receiving path circuitry 110RX, and sequentially processed by the attenuator 114RX, the mixer 113RX, the receiving filter 112RX and the ADC 111RX for generating a feedback signal FB1. The MDPD calculating circuit 140 may compare the feedback signal FB1 with the pre-distortion test signal $TEST_{MDPD}$ to estimate non-linear distortion caused by the power amplifier 114TX, and accordingly calculate and derive a set of pre-distortion coefficients $\{a_{mp}\}$ to be coefficients of a filter within the MDPD circuit 120, to enable the MDPD circuit 120 to perform pre-processing on the transmission signal for compensating the non-linear distortion caused by the power amplifier 114TX.

As the transmitting path circuitry 110TX comprises the transmitting filter 112TX and the receiving path circuitry 110RX comprises the receiving filter 112RX, after the transceiver 10 calibrates the MDPD circuit 120 via the signal path shown in FIG. 3, a frequency response of the MDPD circuit 120 may be distorted. For example, when both the transmitting filter 112TX and the receiving filter 112RX are low pass filters, as amplitude responses of the low pass filters will be suppressed in a high frequency band, performing equalizing compensation by the MDPD circuit 120 which has been calibrated may make the amplitude response rise in the high frequency band. Thus, subsequent steps of the present invention perform pre-equalization processing according to the frequency response of the MDPD circuit 120 after calibration, in order to solve the aforementioned frequency response distortion problem.

In Step S240, after calibration of the set of pre-distortion coefficients of the memory pre-distortion circuit is finished, the communications device utilizes a pre-equalization calculating circuit therein to receive the set of pre-distortion coefficients, to perform calculation on the set of pre-distortion coefficients for generating a calculation result.

In Step S250, the communications device calibrates a pre-equalizer circuit therein according to the calculation result.

When a memory depth of the MDPD circuit 120 is M, the MDPD circuit 120 may generate an output signal at a current time point (e.g., an $n^{th}$ output sample) according to an input signal at the current time point such as a signal x(n) (which may represent an $n^{th}$ input sample received by the MDPD circuit 120), input signals at M previous time points before the current time point such as x(n-1), x(n-2), x(n-3), . . . and x(n-M) (which may respectively represent an $(n-1)^{th}$ input sample, an $(n-2)^{th}$ input sample, an $(n-3)^{th}$ input sample, . . . and an $(n-M)^{th}$ input sample received by the MDPD circuit 120) and the set of pre-distortion coefficients (e.g., $\{a_{mp}\}$), where M and n are positive integers. More particularly, the set of pre-distortion coefficients (e.g., $\{a_{mp}\}$) may comprise (M+1) first-order term coefficients, and the (M+1) first-order term coefficients correspond to one weighting of the input signal at the current time point and M weightings of the input signals at the M previous time points, respectively.

For example, the output signals of the MDPD circuit 120 may be expressed by a Generalized Memory Polynomial (GMP) model as follows:

$$y_{GMP}(n) = \sum_{m=0}^{M}\sum_{p=1}^{P} a_{mp} \cdot x(n-m) \cdot |x(n-m)|^{p-1} +$$

$$\sum_{m=0}^{M}\sum_{p=1}^{P}\sum_{c=1}^{C_{lag}} b_{mpc} \cdot x(n-m) \cdot |x(n-m-c)|^{p-1} +$$

$$\sum_{m=0}^{M}\sum_{p=1}^{P}\sum_{c=1}^{C_{lead}} c_{mpc} \cdot x(n-m) \cdot |x(n-m+c)|^{p-1}$$

where $y_{GMP}(n)$ represents an $n^{th}$ output sample of the MDPD circuit 120, $C_{lead}$ represents a maximum length of lead cross-terms, $C_{lag}$ represents a maximum length of lag cross-terms, and x(n-m) represents an $(n-m)^{th}$ input sample of the MDPD circuit 120. Thus, after the calibration of the set of pre-distortion coefficients (e.g., $\{a_{mp}\}$, $\{b_{mpc}\}$ and $\{c_{mpc}\}$) of the MDPD circuit 120 is finished, the MDPD pre-equalization calculating circuit 150 may perform calculation on the set of pre-distortion coefficients (e.g., $\{a_{mp}\}$, $\{b_{mpc}\}$ and $\{c_{mpc}\}$) to obtain the frequency response distortion generated by the MDPD circuit 120, and accordingly calibrate the MDPD pre-equalizer circuit 130 to make the frequency response of the MDPD pre-equalizer circuit 130 be able to cancel or compensate the frequency response distortion generated by the MDPD circuit 120.

Figure 4:
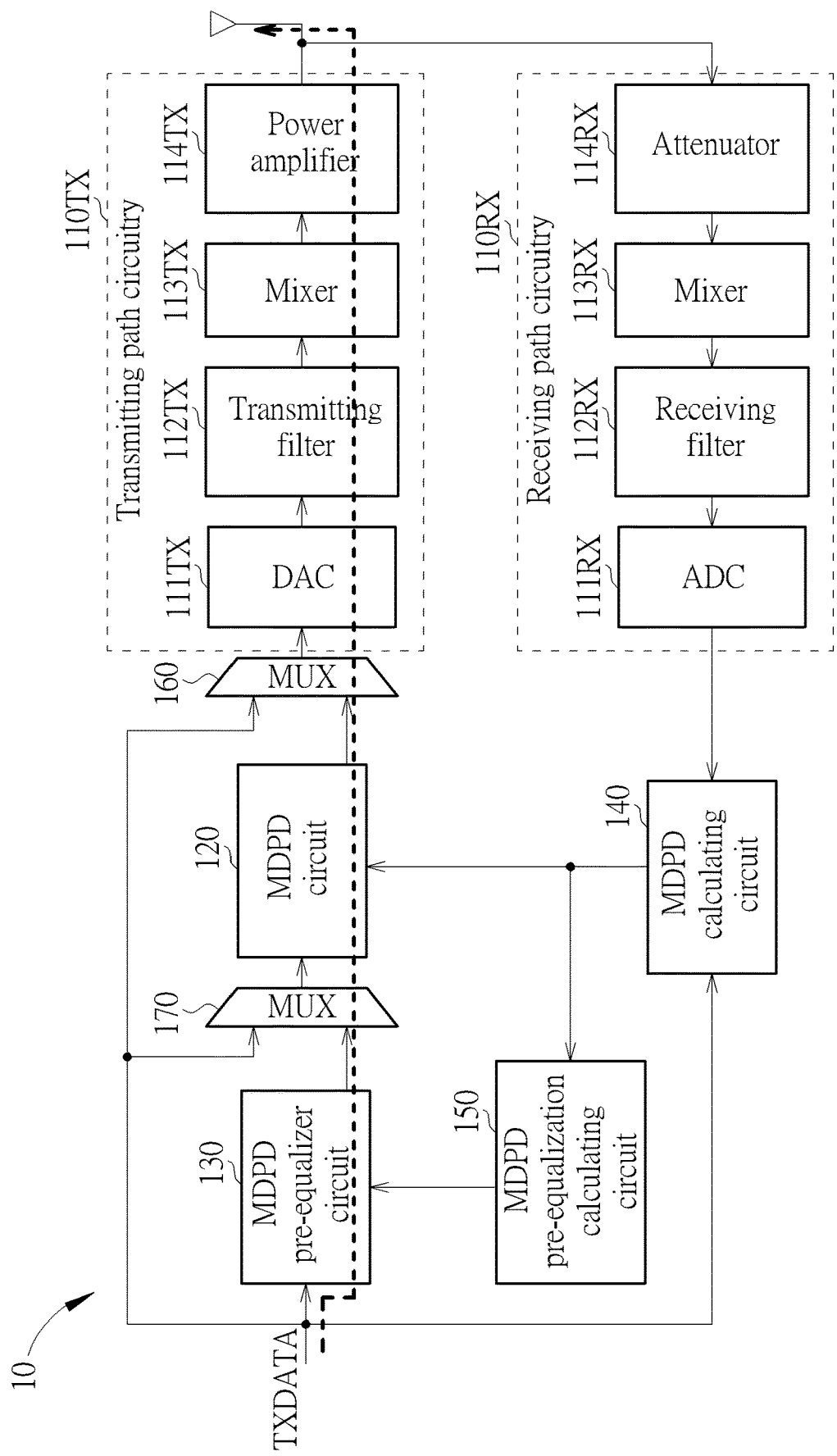
FIG. 4 is a diagram illustrating operations of an MDPD circuit and an MDPD pre-equalizer circuit within the communications device shown in FIG. 1 after calibration of the MDPD circuit and the MDPD pre-equalizer circuit are finished according to an embodiment of the present invention.

As shown in FIG. 4, after calibration of both the MDPD circuit 120 and the MDPD pre-equalizer circuit 130 are finished, the transceiver 10 (e.g., the controller therein) may control the MUX 160 to enable the lower path circuitry thereof and disable the upper path circuitry thereof and control the MUX 170 to enable the lower path circuitry thereof and disable the upper path circuitry thereof, to make a transmission signal TXDATA be sequentially processed by the MDPD pre-equalizer circuit 130 and the MDPD circuit 120 first, and then output to outside the transceiver 10 via the transmitting path circuitry 110TX.

Figure 5:
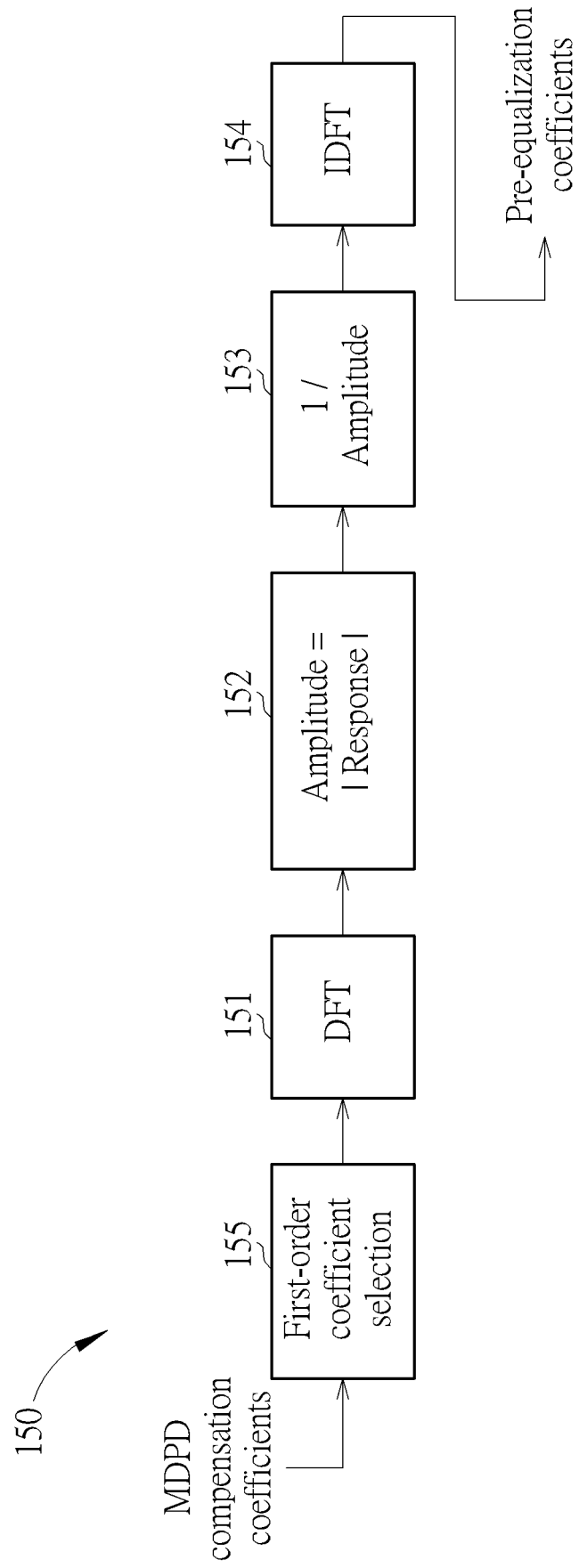
FIG. 5 is a diagram illustrating detailed implementations of an MDPD pre-equalization calculating circuit according to an embodiment of the present invention.

FIG. 5 is a diagram illustrating some detailed implementations of the MDPD pre-equalization calculating circuit 150 according to an embodiment of the present invention. As shown in FIG. 5, the MDPD pre-equalization calculating circuit 150 may comprise a time-domain-to-frequency-domain transform circuit such as a Discrete Fourier Transform (DFT) circuit 151 (labeled "DFT" in FIG. 5 for brevity), a channel estimator such as an absolute value calculating circuit 152 (labeled "Amplitude=|Response|" in FIG. 5 for better comprehension), a reciprocal calculating circuit 152 (labeled "1/Amplitude" in FIG. 5 for better comprehension) and an Inverse Discrete Fourier Transform (IDFT) circuit 154 (labeled "IDFT" in FIG. 5 for brevity). It should be noted that, for the purpose of simplifying the design of the MDPD pre-equalization calculating circuit 150 in order to lower the hardware costs and calculation time thereof, the MDPD pre-equalization calculating circuit 150 does not have to calculate the frequency response of the MDPD circuit 120 based on all of the set of pre-distortion coefficients (e.g., $\{a_{mp}\}$, $\{b_{mpc}\}$ and $\{c_{mpc}\}$). In this embodiment, the coefficients $\{b_{mpc}\}$ and $\{c_{mpc}\}$ of the aforementioned lead cross-terms and lag cross-terms may be omitted. In addition, the MDPD pre-equalization calculating circuit 150 may further comprise a selection circuit 155 (labeled "First-order coefficient selection" in FIG. 5 for better comprehension), which is configured to select multiple first-order term coefficients from the pre-distortion coefficients $\{a_{mp}\}$ and discard remaining pre-distortion coefficients other than these first-order term coefficients, in order to further reduce the hardware costs and calculation time of post-processing operations.

For example, assume that an output signal y(n) of the MDPD circuit 120 after calibration is described by a GMP model with an order number of 5, a memory depth of 3 and a maximum length of lag cross-terms of 1 as follows:

$$\begin{aligned} y(n) = \ & w(1)\cdot x(n) & +w(2)\cdot x(n)\cdot|x(n)|^2 & & +w(3)\cdot x(n)\cdot|x(n)|^4 \\ & +w(4)\cdot x(n-1) & +w(5)\cdot x(n-1)\cdot|x(n-1)|^2 & & +w(6)\cdot x(n-1)\cdot|x(n-1)|^4 \\ & +w(7)\cdot x(n-2) & +w(8)\cdot x(n-2)\cdot|x(n-2)|^2 & & +w(9)\cdot x(n-2)\cdot|x(n-2)|^4 \\ & +w(10)\cdot x(n-3) & +w(11)\cdot x(n-3)\cdot|x(n-3)|^2 & & +w(12)\cdot x(n-3)\cdot|x(n-3)|^4 \\ & & +w(13)\cdot x(n)\cdot|x(n-1)|^2 & & +w(14)\cdot x(n)\cdot|x(n-1)|^4 \\ & & +w(15)\cdot x(n-1)\cdot|x(n-2)|^2 & & +w(16)\cdot x(n-1)\cdot|x(n-2)|^4 \\ & & +w(17)\cdot x(n-2)\cdot|x(n-3)|^2 & & +w(18)\cdot x(n-2)\cdot|x(n-3)|^4 \\ & & +w(19)\cdot x(n-3)\cdot|x(n-4)|^2 & & +w(20)\cdot x(n-3)\cdot|x(n-4)|^4 \end{aligned}$$

where w(13) to w(20) are examples of the coefficients $\{b_{mpc}\}$ of the lag cross-terms, w(2), w(5), w(8) and w(11) are examples of third-order term coefficients within the pre-distortion coefficients $\{a_{mp}\}$, and w(3), w(6), w(9) and w(12) are examples of fifth-order term coefficients within the pre-distortion coefficients $\{a_{mp}\}$. Thus, the selection circuit 155 may discard coefficients other than first-order term coefficients w(1), w(4), w(7) and w(10) among the pre-distortion coefficients $\{a_{mp}\}$, to simplify the output signal y(n) as $y_{SMP}(n)=w(1)\cdot x(n)+w(4)\cdot x(n-1)+w(7)\cdot x(n-2)+w(10)\cdot x(n-3)$, but the present invention is not limited thereto. As the frequency response of the MDPD circuit 120 is typically dominated by the first-order term coefficients, utilizing the aforementioned simplified calculation for calibrating the MDPD pre-equalizer circuit 130 can still make the MDPD pre-equalizer circuit 130 effectively compensate or equalize the frequency response of the MDPD circuit 120, even though the calculation on the set of pre-distortion coefficients is greatly simplified in this embodiment.

In this embodiment, the selection circuit 155 may select (M+1) first-order term coefficients $\{a_{01}, a_{11}, a_{21}, \ldots, a_{M1}\}$ from the set of pre-distortion coefficients (e.g., $\{a_{mp}\}$), and arrange the selected coefficients according to memory depths of respective first-order term coefficients to output $\{d[0], d[1], d[2], \ldots, d[M]\}$ as follows:

$$\begin{bmatrix} d[0] \\ d[1] \\ d[2] \\ \vdots \\ d[M] \end{bmatrix} = \begin{bmatrix} a_{01} \\ a_{11} \\ a_{21} \\ \vdots \\ a_{M1} \end{bmatrix}$$

The DFT circuit 151 may perform time-domain-to-frequency-domain transform such as DFT (which may be implemented by Fast Fourier Transform (FFT) in practice) on the (M+1) first-order term coefficients $\{d[0], d[1], d[2], \ldots, d[M]\}$ output from the selection circuit 155, to obtain (M+1) frequency-domain transform results respectively corresponding to (M+1) frequencies as follows:

$$\begin{bmatrix} D[0] \\ D[1] \\ D[2] \\ \vdots \\ D[M] \end{bmatrix} = DFT \left( \begin{bmatrix} d[0] \\ d[1] \\ d[2] \\ \vdots \\ d[M] \end{bmatrix} \right)$$

Any frequency-domain transform results D[k] of the (M+1) frequency-domain transform results $\{D[k]\}$ may be expressed as follows:

$$D[k] = \sum_{m=0}^{M} d[m] \cdot e^{-j2\pi \frac{k \cdot m}{M+1}}$$

where k=0, 1, 2, . . . , M (respectively corresponding to the (M+1) frequencies), "e" is Euler's number, "π" represents a mathematical constant equal to a circle's circumference divided by its diameter, and "j" may represent $\sqrt{-1}$. The absolute value calculating circuit 152 may perform absolute value calculation on the (M+1) frequency-domain transform results $\{D[k]\}$, respectively, to obtain (M+1) amplitude response values $\{|D[k]|\}$ respectively corresponding to the (M+1) frequencies. As the frequency-domain transform result D[k] obtained by DFT is a complex number, calculation of any amplitude response value $|D[k]|$ of the (M+1) amplitude response values $\{|D[k]|\}$ may be expressed as follows:

$$|D[k]| = \sqrt{\text{real}(D[k])^2 + \text{imag}(D[k])^2}$$

where real(D[k]) represents a real part of the frequency-domain transform result D[k], and imag(D[k]) represents an imaginary part of the frequency-domain transform result D[k]. The reciprocal calculating circuit 153 may perform reciprocal calculation on the (M+1) amplitude response values $\{|D[k]|\}$, respectively, to obtain (M+1) compensation gains $\{S_{PreEQ\_freq}[k]\}$ respectively corresponding to the (M+1) frequencies, and calculation of any compensation gain $S_{PreEQ\_freq}[k]$ of the (M+1) compensation gains $\{S_{PreEQ\_freq}[k]\}$ may be expressed as follows:

$$S_{PreEQ\_freq}[k] = \frac{1}{|D[k]|}$$

The IDFT circuit 154 may perform frequency-domain-to-time-domain transform such as IDFT (which may be implemented by Inverse Fast Fourier Transform (IFFT) in practice) on the (M+1) compensation gains $\{S_{PreEQ\_freq}[k]\}$, to obtain (M+1) pre-equalization coefficients $\{S_{PreEQ\_time}[r]\}$ to be the calculation result, where calculation of any pre-equalization coefficient $S_{PreEQ\_time}[r]$ of the (M+1) pre-equalization coefficients $\{S_{PreEQ\_time}[r]\}$ may be expressed as follows:

$$S_{PreEQ\_time}[r] = \frac{1}{M+1} \sum_{k=0}^{M} S_{PreEQ\_freq}[k] \cdot e^{j2\pi \frac{r \cdot k}{M+1}}$$

where r=0, 1, 2, . . . , M, and the (M+1) pre-equalization coefficients $\{S_{PreEQ\_time}[r]\}$ can make a frequency response of the MDPD pre-equalizer circuit 130 correspond to a frequency response formed by the (M+1) compensation gains $\{S_{PreEQ\_freq}[k]\}$, to thereby achieve the effect of canceling or compensating the frequency response distortion generated by the MDPD circuit 120.

In some embodiments, the MDPD pre-equalizer circuit 130 may comprise a filter such as a finite impulse response (FIR) filter or an infinite impulse response (IIR) filter, and the (M+1) pre-equalization coefficients $\{S_{PreEQ\_time}[r]\}$ may be taken as coefficients of this filter (e.g., (M+1) coefficients respectively corresponding to (M+1) taps in this filter), to make a frequency response of this filter meet the frequency response formed by the compensation gains $\{S_{PreEQ\_freq}[k]\}$, but the present invention is not limited thereto.

It should be noted that each sub-circuit within the MDPD pre-equalization calculating circuit 150 (e.g. the DFT circuit 151, the absolute value calculating circuit 152, the reciprocal calculating circuit 153 and the IDFT circuit 154) may be implemented by dedicated calculating circuits for the aforementioned calculations. In some embodiments, some complicated calculating circuits (e.g. the DFT circuit 151 and/or the IDFT circuit 154) within the MDPD pre-equalization calculating circuit 150 may be implemented by dedicated calculating circuits, and some simple calculations (e.g. absolute value calculations and/or reciprocal calculations) may be executed by existing calculating circuits within the DFT circuit 151 and/or the IDFT circuit 154, or be executed by existing calculating circuits configured outside the MDPD pre-equalization calculating circuit 150, but the present invention is not limited thereto.

To summarize, the present invention utilizes the MDPD circuit 120 to perform pre-distortion processing on an input signal for compensating non-linear distortion of the power amplifier 114TX. As filters on signal paths may get involved in calibration of the MDPD circuit 120, the frequency response of the MDPD circuit 120 may be distorted (e.g. may have a high pass filter feature) after being calibrated. Thus, the present invention utilizes the MDPD pre-equalizer circuit 130 to provide a frequency response (e.g. a low pass filter feature) which is able to cancel the frequency response of the MDPD circuit 120, in order to compensate the frequency response distortion generated by the MDPD circuit 120. The embodiment of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications device, comprising:
    a transmitting path circuitry, configured to generate an output test signal according to a pre-distortion test signal;
    a receiving path circuitry, configured to generate a feedback signal according to the output test signal;
    a memory pre-distortion circuit, electrically coupled with transmitting path circuitry, wherein a set of pre-distortion coefficients of the memory pre-distortion circuit is calibrated according to the feedback signal;
    a pre-equalizer circuit, electrically coupled with the transmitting path circuitry; and
    a pre-equalization calculation circuit electrically coupled with the pre-equalizer circuit and configured to receive the set of pre-distortion coefficients for performing calculation on the set of pre-distortion coefficients for generating a calculation result, after calibration of the set of pre-distortion coefficients of the memory pre-distortion circuit is finished;
    wherein after the pre-equalizer circuit is calibrated according to the calculation result, a transmission signal is outputted via the transmitting path circuitry after the transmission signal is processed by the pre-equalizer circuit and the memory pre-distortion circuit;
    wherein a memory depth of the memory pre-distortion circuit is M, the memory pre-distortion circuit generates an output signal at a current time point according to an input signal at the current time point, input signals at M previous time points before the current time point and the set of pre-distortion coefficients, M is a positive integer, the set of pre-distortion coefficients comprise (M+1) first-order term coefficients, the (M+1) first-order term coefficients correspond to one weighting of the input signal at the current time point and M weightings of the input signals at the M previous time points, respectively, and the calculation performed on the set of pre-distortion coefficients by the pre-equalization calculating circuit comprises:
        the pre-equalization calculating circuit performs time-domain-to-frequency-domain transform on the (M+1) first-order term coefficients to obtain (M+1) frequency transform results respectively corresponding to (M+1) frequencies;
        the pre-equalization calculating circuit performs absolute value calculation on the (M+1) frequency transform results, respectively, to obtain (M+1) amplitude response values respectively corresponding to the (M+1) frequencies;
        the pre-equalization calculating circuit performs reciprocal calculation on the (M+1) amplitude response values, respectively, to obtain (M+1) compensation gains respectively corresponding to the (M+1) frequencies; and
        the pre-equalization calculating circuit performs frequency-domain-to-time-domain transform on the (M+1) compensation gains, to obtain (M+1) pre-equalization coefficients to be the calculation result, wherein the (M+1) pre-equalization coefficients makes a frequency response of the pre-equalizer circuit correspond to a frequency response formed by the (M+1) compensation gains.

2. The communications device of claim 1, wherein the memory pre-distortion circuit is configured to compensate non-linear distortion of a power amplifier within the transmitting path circuitry.

3. The communications device of claim 1, wherein the pre-equalizer circuit is configured to compensate frequency response distortion generated by the memory pre-distortion circuit being calibrated under a condition of either of the transmitting path circuitry and the receiving path circuitry comprising a filter.

4. A method for compensating frequency response distortion of a communications device, comprising:
    utilizing a transmitting path circuitry of the communications device to generate an output test signal according to a pre-distortion test signal;
    utilizing a receiving path circuitry of the communications device to generate a feedback signal according to the output test signal;
    calibrating a set of pre-distortion coefficients of a memory pre-distortion circuit of the communications device according to the feedback signal;
    utilizing a pre-equalization calculating circuit of the communications device to receive the set of pre-distortion coefficients for performing calculation on the set of pre-distortion coefficients for generating a calculation result, after calibration of the set of pre-distortion coefficients of the memory pre-distortion circuit is finished; and
    calibrating a pre-equalizer circuit of the communications device according to the calculation result;
    wherein after the pre-equalizer circuit is calibrated according to the calculation result, a transmission signal is outputted via the transmitting path circuitry after the transmission signal is processed by the pre-equalizer circuit and the memory pre-distortion circuit;
    wherein a memory depth of the memory pre-distortion circuit is M, the memory pre-distortion circuit generates an output signal at a current time point according to an input signal at the current time point, input signals at M previous time points before the current time point and the set of pre-distortion coefficients, M is a positive integer, the set of pre-distortion coefficients comprise (M+1) first-order term coefficients, the (M+1) first-order term coefficients correspond to one weighting of the input signal at the current time point and M weightings of the input signals at the M previous time points, respectively, and performing the calculation on the set of pre-distortion coefficients to generate the calculation result comprises:
        performing time-domain-to-frequency-domain transform on the (M+1) first-order term coefficients to obtain (M+1) frequency transform results respectively corresponding to (M+1) frequencies;
        performing absolute value calculation on the (M+1) frequency transform results, respectively, to obtain (M+1) amplitude response values respectively corresponding to the (M+1) frequencies;
        performing reciprocal calculation on the (M+1) amplitude response values, respectively, to obtain (M+1)

compensation gains respectively corresponding to the (M+1) frequencies; and performing frequency-domain-to-time-domain transform on the (M+1) compensation gains, to obtain (M+1) pre-equalization coefficients to be the calculation result;

wherein the (M+1) pre-equalization coefficients make a frequency response of the pre-equalizer circuit correspond to a frequency response formed by the (M+1) compensation gains.

5. The method of claim 4, wherein the memory pre-distortion circuit is configured to compensate non-linear distortion of a power amplifier within the transmitting path circuitry.

6. The method of claim 4, wherein the pre-equalizer circuit is configured to compensate frequency response distortion generated by the memory pre-distortion circuit being calibrated under a condition of either of the transmitting path circuitry and the receiving path circuitry comprising a filter.

* * * * *